March 15, 1966  D. H. VAN TUYL  3,240,302
FRICTION TYPE COUPLING HAVING HIGH HEAT DISSIPATING ABILITY
Filed Sept. 19, 1963  4 Sheets-Sheet 1

INVENTOR.
DAVID H. VAN TUYL
BY Bruce & Brosler
HIS ATTORNEYS

INVENTOR.
DAVID H. VAN TUYL

March 15, 1966 D. H. VAN TUYL 3,240,302
FRICTION TYPE COUPLING HAVING HIGH HEAT DISSIPATING ABILITY
Filed Sept. 19, 1963 4 Sheets-Sheet 3

*INVENTOR.*
DAVID H. VAN TUYL
BY Bruce & Brosler
HIS ATTORNEYS

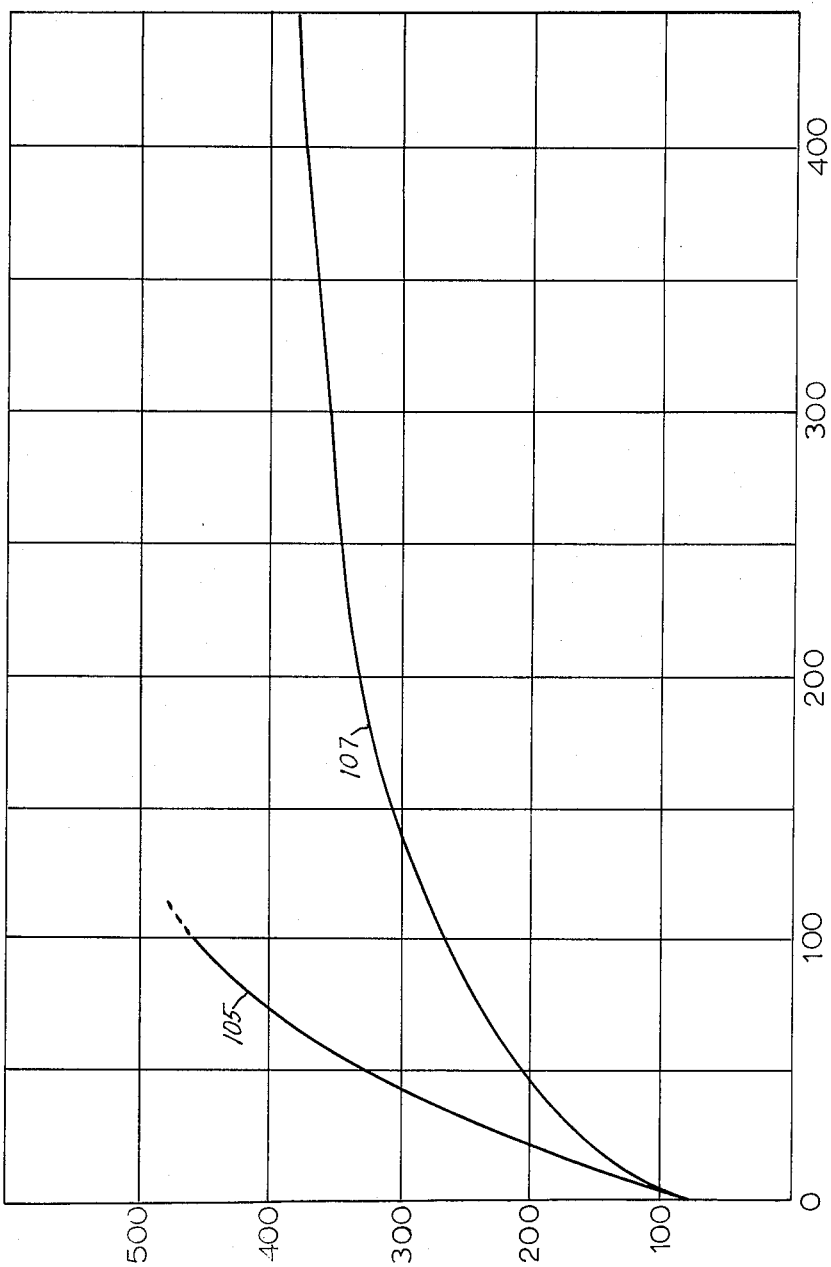

United States Patent Office
3,240,302
Patented Mar. 15, 1966

3,240,302
FRICTION TYPE COUPLING HAVING HIGH HEAT DISSIPATING ABILITY
David H. Van Tuyl, Palo Alto, Calif., assignor, by mesne assignments, to United Electrodynamics, Inc., Pasadena, Calif., a corporation of California
Filed Sept. 19, 1963, Ser. No. 310,112
7 Claims. (Cl. 192—18)

My invention relates to friction type couplings such as clutch and/or brake coupling assemblies, and more particularly to the maintenance of proper operating temperatures in such devices.

Clutch and/or brake assemblies function through engagement of friction surfaces and consequently considerable quantities of heat are developed in the friction elements, which if not removed from the environment, result in elevated temperatures sufficiently high to impair efficient operation and bring about ultimate deterioration and destruction of such elements.

Among the objects of my invention are:

(1) To provide a novel and improved clutch and/or brake type assembly which will function cooler than others of comparable size;

(2) To provide a novel and improved means for removing heat from the friction elements of a clutch or brake type assembly;

(3) To provide a novel and improved assembly for a clutch and/or brake type coupling assembly, adapted to remove heat from within the friction elements of such assembly at a rate sufficient to hold temperature below a tolerable value; and (4) To provide novel and improved means for extending the operating range of a given clutch and/or brake assembly, to effect economies as to size and cost for a specific application.

Additional objects of my invention will be brought out in the following description of a preferred embodiment of the same taken in conjunction with the accompanying drawings wherein:

FIGURE 6 is a view involving comparative curves, depicting the effectiveness of the present invention in accomplishing its objectives.

Figure 1:
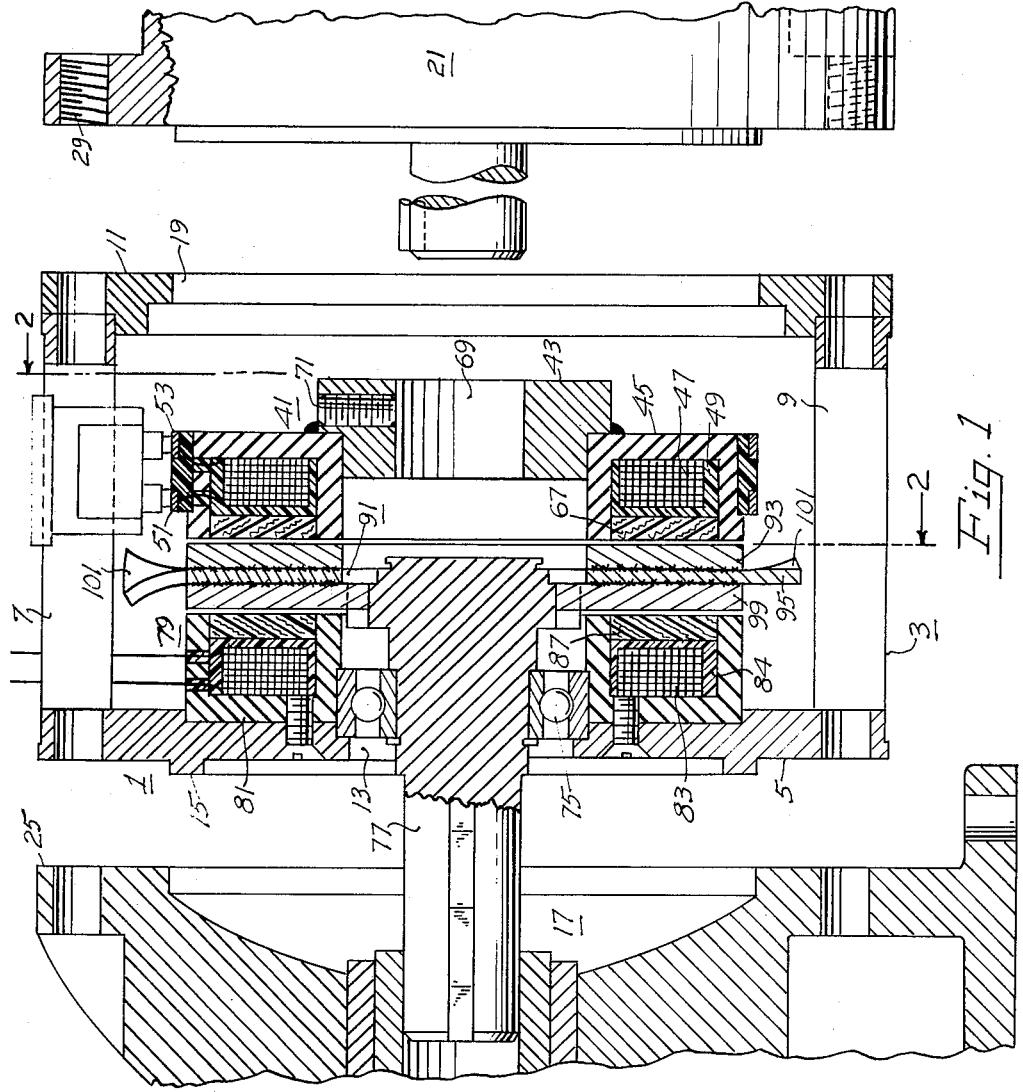
FIGURE 1 is a view in section through a combined clutch and brake assembly employing the present invention.
Figure 2:
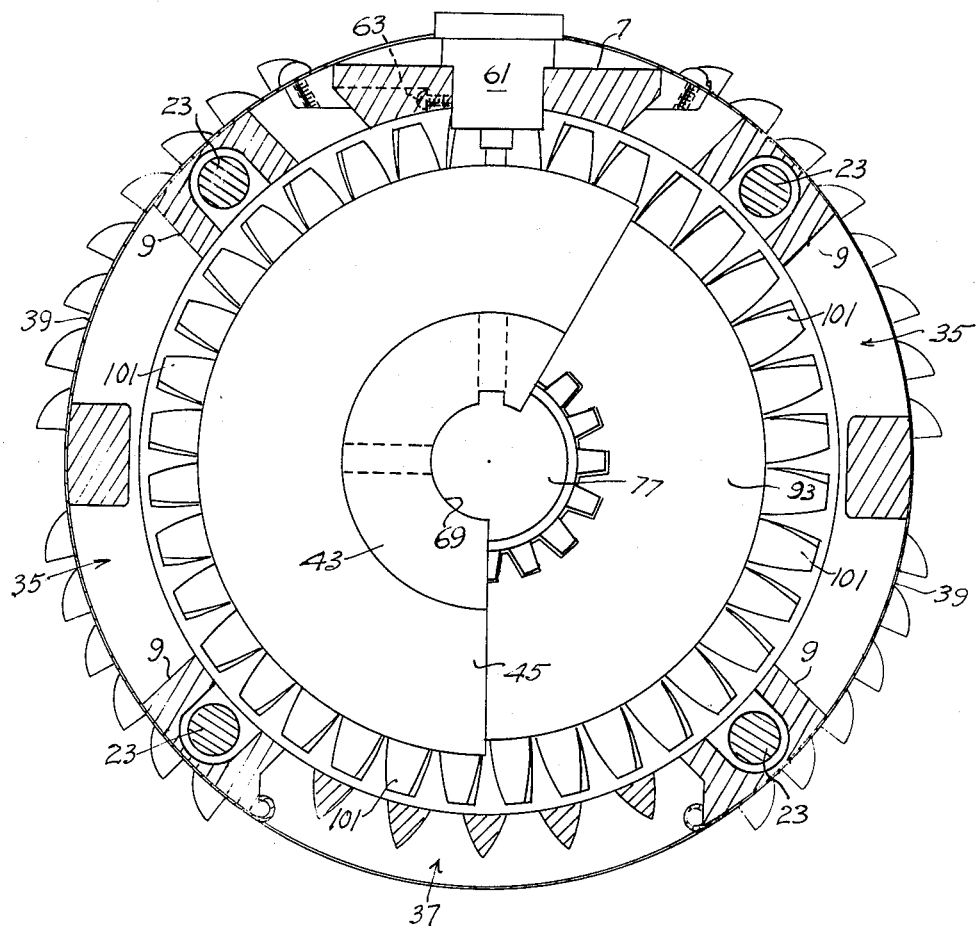
FIGURE 2 is an end sectional view of the clutch and brake assembly of FIGURE 1 taken in the planes 2—2 of FIGURE 1.

Referring to the drawings for details of my invention in its preferred form, the embodiment depicted in FIGURE 1 illustrates the invention as incorporated in a combined clutch/brake coupling assembly involving a housing 1 which may preferably be of the type illustrated and described in the application of Turner G. Brashear, Jr. for Clutch and/or Brake Type Coupling, Serial No. 306,370 filed September 3, 1963, wherein a frame 3 includes an end wall 5 having integrally formed therewith, a longitudinal wall section 7 and peripherally spaced longitudinal bars 9, the wall section 7 and bars 9, being adapted to receive and support an opposite end wall 11.

The first end wall 5 is formed with an axial shaft opening 13 and an encircling rib 15 adapted to mesh with a complementary groove in a load 17 to be driven, so as to properly align the coupling housing with such load, while the opposite end wall is formed with an enlarged opening 19 adapted to receive a corresponding aligning boss on a drive motor 21.

The coupling housing is maintained in such relationship to the load and the drive motor by mounting bolts 23 passing through a suitable mounting flange 25 on the load, aligned bolt openings in the end walls of the coupling housing, and into aligned threaded holes 29 in the proximate end of the motor casing. The longitudinal bars 9 of the coupling housing are preferably channeled to receive and permit passage of such mounting bolts.

Such construction of the coupling housing leaves side openings 35 and a bottom opening 37 in the frame. The side openings may each be closed in by a lowered wall section or cover 39 formed of sheet metal or other material. When these louvred wall section covers are installed, the bottom opening will remain open to permit of the influx of cooling air to supplant heated air which may have escaped from within the housing through the louvred wall sections.

The coupling housing briefly described above, is merely representative of a form of housing suitable to the present invention, in that it permits of assembling the clutch and brake mechanism through the open end of the frame 3 prior to the application of the end wall 11. However, the details of construction of such housing are not particularly pertinent to the present invention, but are merely cited as illustrative of a preferred type of housing.

Within the housing facing the motor attachment end is a friction rotor 41 for a clutch assembly, such friction rotor comprising a circular plate or hub 43 formed to provide a shoulder to receive a coil housing 45 of magnetic material for housing a clutch coil 47, the coil housing being affixed to the hub by welding or other suitable means.

The coil housing is in the form of a circular trough in which the coil is maintained by a filling 49 of plastic material. The terminal wires of such coil are brought out through small openings provided in the coil housing and connected to a pair of slip rings 51, 53 surrounding the housing and preferably sustained in position by plastic.

To provide for electrical connection to the coil by way of the slip rings, the longitudinal wall section 7 is provided with a slot to slidably receive a brush assembly 61 to permit adjustment of the brush assembly into alignment with the slip rings. To maintain such adjustment, the wall section is undercut to create an adjacent wall for a screw 63 with which to lock the brush assembly against undesired shifting.

The open end of the coil trough is closed by a ring 67 of friction material such as brake lining or the like, which is embedded in the plastic material surrounding the coil and retained thereby.

The disc or hub of the clutch rotor assembly has an axial passage 69 to receive the shaft of the drive motor, whereby the clutch rotor assembly may be mounted on the drive shaft of the motor for installation and support within the coupling housing. A set screw 71 radially disposed in the hub may be used to lock the rotor assembly at any desired adjusted position on the motor drive shaft.

The end wall 5 at the load end of the coupling housing has a bearing assembly 75 installed in the axial opening therein, in which bearing assembly is journaled the enlarged end of a stub shaft 77 protruding from the housing.

Concentric with the bearing assembly and affixed to the proximate end wall of the coupling housing, is a brake coil assembly 79 including a circular trough shaped housing 81 similar to that previously described and including a coil 83 similar to the clutch coil and similarly supported within its trough shaped housing by plastic 84 in which it is embedded, the terminal leads of such coil emerging through small openings provided in the coil housing and brought out through the coupling housing.

The open end of this coil housing, like that of the clutch coil housing, is closed by a ring 87 of brake lining, similarly held in place by the plastic within the housing.

Intermediate the clutch coil assembly and the brake coil assembly, is an armature assembly 91 to which the present invention is primarily directed. This armature assembly comprises an armature disc 93 of magnetic material, of size and shape adapted to cover the face of either the clutch coil assembly or the brake coil assembly. To one side of this armature disc is intimately joined, a disc 95 in heat transfer relationship therewith, such disc being of copper or other material having better heat conductivity characteristics than the magnetic material of the armature disc. Such intimate joining of the two may be effected in any known manner such as by silver soldering or the like. To the other side of the copper disc is similarly affixed an armature disc 99 of magnetic material, the three discs forming a unit assembly.

The resulting intermediate disc is of an outside diameter sufficient to extend beyond the peripheral edge of each of the associated armature discs, the extended or overhanging rim portion being slit radially at numerous spaced points thereabouts, and the resulting tabs twisted to an angle of approximately 45° to form vanes 101.

The armature assembly thus formed is slidably mounted on the enlarged end of the stub shaft between the clutch coil assembly and the brake coil assembly, with but slight clearance being realizable between either of the armature discs and its associated coil assembly.

Such slidable mounting of the armature assembly may be effectively realized by splining the enlarged end of the stub shaft and forming an axial opening through one of the armature discs of a complementary shape adapted to slidably fit onto the splined end of the stub shaft, the remaining disc elements of the armature assembly having axial opening of a diameter sufficient to permit such axial movement without interference.

By connecting the clutch coil and the brake coil to the terminals of a double throw switch or its equivalent (not shown), whereby either coil may be energized to the exclusion of the other, it will become apparent that when the clutch coil is energized, the armature assembly will be attracted thereto the exclusion of the brake coil assembly, and a drive connection will be effected between the drive motor and the stub shaft for the driving of any load coupled thereto, and when the brake coil is energized, the clutch coil will be de-energized, and the armature will be attracted to the brake coil housing to disassociate the drive motor from the load and place a brake on the load. Both operations result in the development of considerable heat, the permitted accumulation of which will unduly elevate the temperature of the friction elements and result in impaired operation and ultimate deterioration of the materials involved.

The presence of the intermediate disc of copper or other excellent heat conductive material in the armature assembly, will serve to rapidly withdraw heat from the friction face of the armature discs as it is developed therein, and such heat will be conducted toward its periphery due to the resulting temperature gradient developed, from where it is dissipated. The vane construction not only increases the radiation surface by an amount of the order of 30%, but the resulting fan action due to the rapid rotation of the armature assembly, particularly while driving through the clutch assembly, will not only serve to increase the rate of dissipation of heat from the intermediate disc, but will function as a blower to stimulate flow of cooling air through the assembly.

A glance at the comparative curves depicted in FIGURE 6 of the drawings, will demonstrate very clearly, the effectiveness of the armature assembly of the present invention in dissipating heat from the friction elements. Both curves represent runs under identical conditions, the upper curve 105, obtained with a conventional solid disc armature after only 100 clutch cycles, each involving 6 sec. of clutch operation and 6 sec. of braking, reached a temperature of 460 degrees F. without stabilizing, while the lower curve 107, developed with an armature assembly of the present invention, incorporating a copper disc formed with peripheral vanes, stabilized below 400 degrees F., the run having been conducted for a period of 860 cycles before being terminated.

Figure 3:
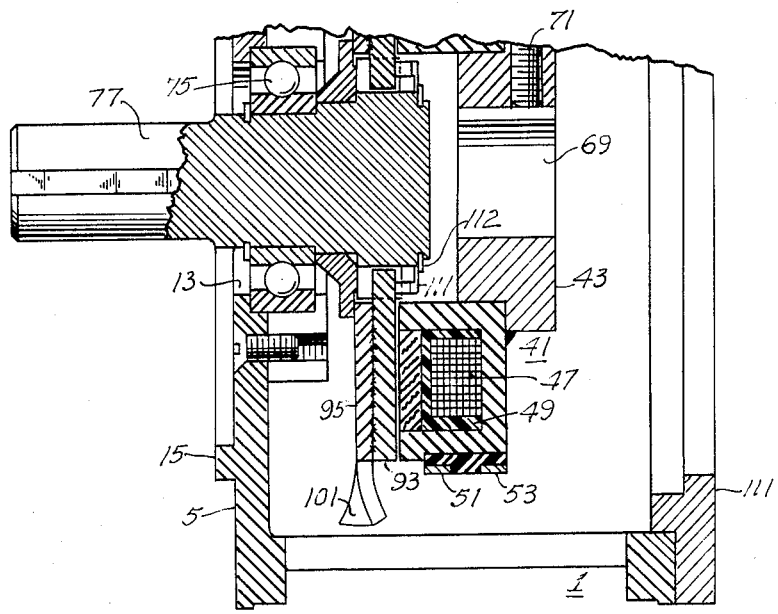
FIGURE 3 is a fragmentary view in section of the pertinent portion of a clutch assembly in which the present invention has been incorporated.
Figure 4:
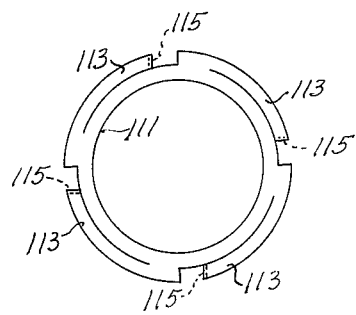
FIGURE 4 is a frontal view depicting a spring employed in the clutch assembly of FIGURE 3.
Figure 5:
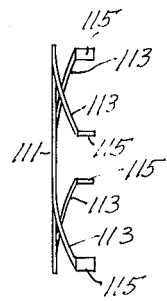
FIGURE 5 is an edge view of the spring of FIGURE 4.

The armature assembly described above in connection with a combined clutch/brake assembly, may be readily adapted for use in connection with a clutch assembly alone, or with a brake assembly alone. In either case, only one armature disc of magnetic material is called for, and consequently, the disc of copper or other excellent heat conductive material, with the radiating fins about the periphery thereof, will be intimately joined with but one armature disc, and this one armature disc will have the splined opening for slidably mounting the resulting armature assembly on the enlarged end of the stub shaft. Such is shown in FIGURE 3 of the drawings, in association with a clutch coil assembly and when so employed, it becomes desirable to apply and maintain a slight spring pressure against the armature assembly in the direction of separation thereof from the clutch coil assembly, to assure positive separation, during de-energized periods of the clutch coil.

This can be realized by a spring washer 111 about the inner end of the stub shaft, retained in place by a snap ring 112, said washer having spring fingers 113 each terminating in a tab 115 in pressure contact with the proximate spline of the armature disc.

In like manner, the armature assembly of the present invention may be applied to a brake assembly only.

While the armature assembly embodying the present invention has been illustrated and described in connection with its application in a combined clutch/brake coupling assembly and in connection with either a clutch assembly by itself or brake assembly by itself, a similar construction functioning in like manner and for a like purpose may be employed in a safe release brake of the type wherein an armature faced with brake lining, is electromagnetically held in spaced relationship to a rotor against the restoring force of strong springs, in a device wherein a motor drives a load through such rotor and during energization of such motor. Upon loss of power to the motor, the armature with its brake lining facing, will be released to engage the rotor and brake the load.

In applying the invention to a device of this type, it will find application to the rotor instead of the armature, and such rotor will employ a disc of copper or other excellent heat conductive material, provided with peripheral vanes as previously described. Affixed to the same will be a metal dics which may be similar to the previously mentioned armature disc of magnetic material, though it is not essential that the disc be of magnetic material.

It will be apparent from the foregoing description of my invention, that the same is subject to alteration and modifications without departing from the underlying principles involved, and I accordingly, do not desire to be limited to the specific details illustrated and described except as may be necessitated by the appended claims.

I claim:
1. An assembly adapted for use in a clutch and/or brake type coupling comprising
    a disc of material in which heat will be developed in the operation of such coupling,
    a plurality of vanes disposed about said disc in heat transfer relationship therewith and extending radially beyond the perimeter of the disc, with each of said vanes being turned about a radius of the disc to define a pitch angle with the disc so that the periphery of the disc is provided with a fan-like structure to thereby heat couple the disc with the ambient air.

2. An assembly adapted for use in a clutch and/or brake type coupling comprising
a disc of material in which heat will be developed in the operation of such coupling,
a disc of better heat conductive material than said first material, intimately joined on one side with said first disc in heat transfer relationship therewith,
said disc of better heat conductive material extending beyond the peripheral edge of said other disc with its extended portion formed into a plurality of vanes extending radially away from said second disc and turned an equal amount about a radius of the second disc to define a pitch angle therewith so that the periphery of the second disc is provided with a fan-like structure to thereby thermally couple the first disc axially to the second disc and to the vanes thereabout.

3. An assembly adapted for use in a clutch and/or brake type coupling comprising
a disc of material in which heat will be developed in the operation of such coupling,
a disc of better heat conductive material than said first material, intimately joined on one side with said first disc in heat transfer relationship therewith,
a second disc of material in which heat will be developed in the operation of said coupling, said second disc being intimately joined with said disc of better heat conductive material on its other side, in heat transfer relationship therewith,
all three discs forming a unit assembly, and
said disc of better heat conductive material extending beyond the peripheral edge of each of said other discs, with its extended portion formed into a plurality of vanes extending radially away from said second disc and turned an equal amount about a radius of the second disc to define a pitch angle therewith so that the periphery of the second disc is provided with a fan-like structure to thereby thermally couple the first disc axially to the second disc and to the vanes thereabout.

4. An assembly adapted for use in a clutch and/or brake type coupling comprising
a disc of magnetic material,
a disc of better heat conductive material than said magnetic material intimately joined on one side with said disc of magnetic material in heat transfer relationship therewith,
a second disc of magnetic material intimately joined with said disc of better heat conductive material on its other side, in heat transfer relationship therewith,
all three discs forming a unit assembly, and
said disc of better heat conductive material extending beyond the peripheral edge of each of said other discs, with its extended portion formed into a plurality of vanes extending radially away from said second disc and turned an equal amount about a radius of the second disc to define a pitch angle therewith having a maximum value of about 45° so that the periphery of the second disc is provided with a fan-like structure to thereby thermally couple the first disc axially to the second disc and to the vanes thereabout.

5. In a clutch and/or brake type assembly,
an electrically energizable toroidal coil assembly having a facing of friction material,
an armature assembly including
a disc of magnetic material,
a plurality of vanes disposed about said disc of magnetic material in heat transfer relationship therewith said vanes extending radially away from the second disc and turned an equal amount about a radius of the second disc to define a pitch angle therewith so that the periphery of the second disc is provided with a fan-like structure to thereby thermally couple the first disc axially to the second disc and to the vanes thereabout,
a shaft,
means slidably mounting said armature assembly on said shaft within the magnetic influence of said coil, and between a position in engagement with said friction material and a position in spaced relationship to said soil assembly.

6. In a cluch and/or brake type assembly,
an electrically energizable toroidal coil assembly having a facing of friction material,
an armature assembly including
a disc of magnetic material,
a disc of better heat conductive material than said magnetic material, and intimately affixed to said disc of magnetic material in heat transfer relationship therewith, and forming a unit assembly,
said disc of better heat conductive material extending beyond the peripheral edge of said disc of magnetic material, with its extended portion formed into a plurality of vanes, said vanes extending radially away from the second disc and turned an equal amount about a radius of the second disc to define a pitch angle therewith so that the periphery of the second disc is provided with a fan-like structure to thereby thermally couple the first disc axially to the second disc and to the vanes thereabout,
a shaft,
means slidably mounting said unit assembly on said shaft within the magnetic influence of said coil, between a position in engagement with said friction material and a position in spaced relation to said coil assembly.

7. In a clutch and/or brake coupling assembly having an armature subject to the development of excessive heat as the armature is brought into frictional engagement with means moving relatively to the armature,
the armature comprising
an armature disc of magnetic material,
a disc of high heat conductivity bonded to said first disc and in intimate heat transfer relationship therewith,
the second disc having a diameter larger than the first disc so that it extends beyond the perimeter of the first disc,
the portion extending beyond the first disc being slit radially at numerous spaced points thereabout to form a plurality of tab-like vanes,
said vanes being twisted at their outermost extermities to form a pitch angle with respect to the second disc and thereby creating a plurality of vanes having fan-like form for coupling with the ambient air so that heat developed in said magnetic disc is transferred axially into said heat conductive disc and radially within the heat conductive disc to the vanes from which it is dissipated into the ambient air.

References Cited by the Examiner

UNITED STATES PATENTS

| | | | |
|---|---|---|---|
| 2,359,361 | 10/1944 | Gleszer et al. | 192—107 X |
| 2,684,744 | 7/1954 | Myers | 192—84 X |
| 2,851,865 | 9/1958 | Jacobs | 192—84 X |
| 2,924,314 | 2/1960 | Shepard | 192—84 X |
| 2,970,681 | 2/1961 | Timmcke | 192—111 |
| 2,973,850 | 3/1961 | Jaeschke | 192—111 X |
| 3,062,348 | 11/1962 | Batchelor et al. | 188—264.2 X |

DON A. WAITE, *Primary Examiner.*

DAVID J. WILLIAMOWSKY, *Examiner.*